United States Patent [19]

Nebelung

[11] Patent Number: 4,548,635
[45] Date of Patent: Oct. 22, 1985

[54] COOLING ARTICLES OF NEWLY MOULDED GLASSWARE

[75] Inventor: Hermann H. Nebelung, Zurich, Switzerland

[73] Assignee: Emhart Industries, Inc., Farmington, Conn.

[21] Appl. No.: 666,600

[22] Filed: Oct. 31, 1984

[30] Foreign Application Priority Data

Nov. 16, 1983 [GB] United Kingdom ................. 8330571

[51] Int. Cl.⁴ .............................................. C03B 35/12
[52] U.S. Cl. ............................................ 65/84; 65/85; 65/348; 65/351
[58] Field of Search ...................... 65/83, 84, 85, 351, 65/348, 181

[56] References Cited

U.S. PATENT DOCUMENTS

| 2,182,167 | 12/1939 | Berthold | 65/348 |
| 2,309,290 | 1/1943 | Aksomitas | 65/348 |
| 2,833,088 | 5/1958 | Olson et al. | 65/348 |
| 3,449,102 | 6/1969 | Nedelec et al. | 65/348 X |
| 3,449,104 | 6/1969 | Hamilton | 65/181 |
| 3,764,284 | 10/1973 | Rowe | 65/83 X |
| 4,508,557 | 4/1985 | Fenton | 65/351 X |

FOREIGN PATENT DOCUMENTS 264857  11/1949  Switzerland .................. 65/348

Primary Examiner—Arthur Kellogg
Attorney, Agent, or Firm—H. Samuel Kieser

[57] ABSTRACT

A newly-moulded article of glassware is positioned on a dead plate with a central opening of the dead plate beneath a central region of the bottom of the article and a plurality of grooves or openings extending from beyond the article to beneath the bottom thereof. Air is sucked through the central opening so that it flows through the grooves or openings past the bottom of the article. Air is also blown on the sidewalls of the article through a plurality of nozzles uniformly spaced around the article.

8 Claims, 2 Drawing Figures

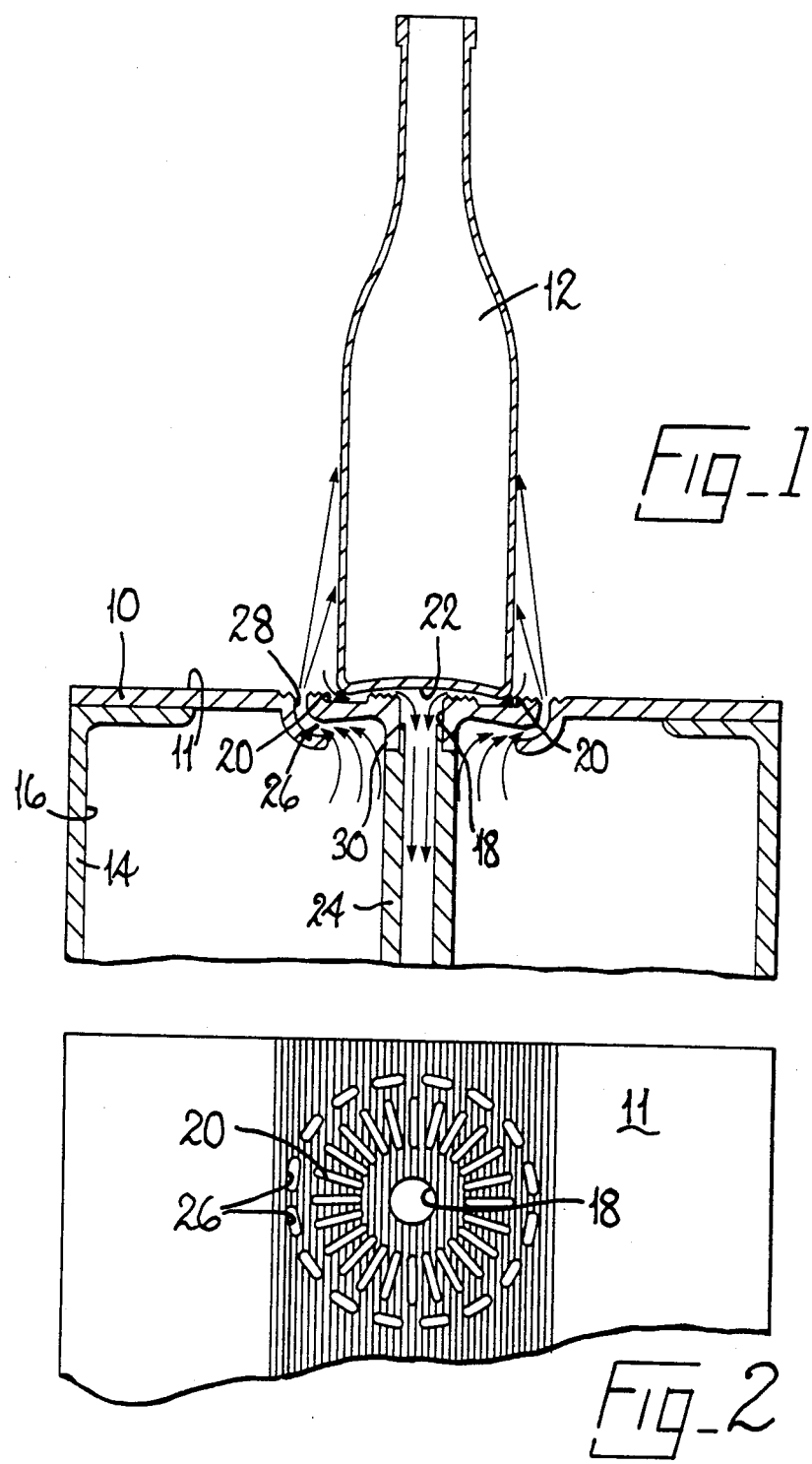

COOLING ARTICLES OF NEWLY MOULDED GLASSWARE

BACKGROUND OF THE INVENTION

This invention is concerned with cooling articles of newly-moulded glassware and particularly with a method of cooling a newly-moulded article of glassware and with a dead plate arrangement for a glassware manufacturing machine on which an article of glassware is cooled.

Known machines which manufacture articles of glassware have a mechanism which grips newly-moulded articles and lifts them away from the moulds in which they have been formed. This mechanism is called a take-out mechanism and moves the articles to a dead plate of the machine. The articles are then held in a position above the dead plate by the take-out mechanism and cooling air is blown on to the articles, normally through perforations in the dead plate, to cool the articles. The take-out mechanism then positions the articles on the dead plate and releases them so that they can be removed from the machine on to a conveyor belt by a wipe-out mechanism. The cooling of the articles takes place before the articles are positioned on the dead plate because, if they are positioned on the dead plate and immediately released by the take-out mechanism, cooling air blowing over the article may displace it on the dead plate, or in extreme cases blow it off the dead plate, so that the wipe-out mechanism will not be able to remove the article correctly. Furthermore, if the articles are placed on the dead plate before the cooling air is blown over them, the bottom of the article does not receive sufficient cooling as the air is unable to flow past the bottom. Thus, the take-out mechanism has to hold the articles during cooling before positioning them on the dead plate and is not available to return to collect further articles until after the cooling has taken place. Furthermore, known cooling arrangements involve the generation of a considerable amount of noise and heat in the atmosphere around the dead plate making the working environment unpleasant for the operator of the machine.

It is an object of the present invention to enable cooling of articles of glassware to take place on a dead plate without requiring the articles to be held in position by the take-out mechanism of the machine in which the articles have been moulded.

BRIEF SUMMARY OF THE INVENTION

The invention provides a method of cooling a newly-moulded article of glassware, the method comprising positioning the article on a substantially horizontal upper surface of a dead plate, the upper surface having a central opening therein and a plurality of grooves or openings formed in the upper surface around the central opening, the article being positioned so that the central opening is beneath a central region of the bottom of the article and each of the grooves or openings extends from beyond the article to beneath the bottom of the article, the method also comprising sucking air through the central opening so that the air is sucked through the grooves or openings into the central opening and the air flows past the bottom of the article, and blowing air on to side walls of the article through a plurality of nozzles which are substantially uniformly spaced around the article so that air is caused to flow past the sidewalls.

In a method according to the last preceding paragraph, an article is prevented from moving on the dead plate once positioned thereon by suction created by sucking the air through the central opening in the dead plate. There is also no tendency for the article to move sideways since forces applied thereto by the air blown through the nozzles are equal around the article. Furthermore, the bottom of the article is cooled by air passing through the grooves or openings to the central opening.

Sucking the air through the central opening may be commenced before the article is positioned as aforesaid in order to ensure that the suction acts to maintain the article in position as soon as it is positioned.

In order to enable the desired amount of cooling to be applied to the article, blowing air on to sidewalls may be commenced after the article is positioned as aforesaid and be continued for a predetermined time.

The invention also provides a dead plate arrangement for a glassware manufacturing machine, the arrangement comprising a dead plate having a substantially horizontal upper surface on which newly-moulded articles of glassware can be positioned for cooling, the upper surface having a central opening therein and a plurality of grooves of openings formed in the upper surface around the central opening, the grooves or openings being so positioned that, when an article of glassware is positioned on the upper surface so that the central opening is beneath a central region of the bottom of the article, each of the grooves or openings extends from beyond the article to beneath the bottom of the article, the arrangement also comprising suction means operable to suck air through the central opening in the dead plate so that, when an article is positioned as aforesaid, the suction means is operable to suck air through the grooves of openings into the central opening so that the air flows past the bottom of the article, and blowing means operable, when an article is positioned as aforesaid, to blow air on to sidewalls of the article through a plurality of nozzles which are substantially uniformly spaced around the article so that air is caused to flow past the sidewalls.

Conveniently, the nozzles through which air is blown on to sidewalls of the article may be formed by openings in the upper surface of the dead plate. In this case, the nozzles may communicate with a chamber beneath the dead plate and the blowing means may comprise a fan operable to blow air into said chamber.

In order to ensure that the article is held in position on the dead plate throughout the required period, the arrangement may also comprise valve means operable, in timed relationship to the operation of the machine, to cause the suction means to begin to operate before an article is positioned as aforesaid in the operation of the machine and to continue operating until the article is removed from the dead plate.

In order to give control of the amount of cooling applied to the article, the dead plate arrangement may also comprise valve means operable in timed relationship to the operation of the machine, to cause the blowing means to begin to operate when an article is positioned as aforesaid and to continue operating for a predetermined period.

BRIEF DESCRIPTION OF THE DRAWINGS

There now follows a detailed description, to be read with reference to the accompanying drawings of a method of cooling a newly-moulded article of glassware and a dead plate arrangement for a glassware manufacturing machine which are illustrative of the invention. It is to be understood that the illustrative method and dead plate arrangement have been selected for description by way of example and not of limitation of the invention.

In the drawings:

FIG. 1 is a vertical cross-sectional view of the illustrative dead plate arrangement showing an article of glassware in position thereon; and FIG. 2 is a plan view of the illustrative dead plate arrangement.

DETAILED DESCRIPTION OF PREFERRED EMBODIMENT OF THE INVENTION

The illustrative dead plate arrangement forms part of a glassware manufacturing machine of the individual section type. The arrangement comprises a dead plate 10 having a substantially horizontal upper surface 11 on which newly-moulded articles of glassware 12 can be positioned for cooling. The dead plate 10 is supported by frame members 14 of the machine which act to form an enclosed chamber 16 beneath the dead plate 10.

The upper surface 11 has a central opening 18 therethrough which is circular in plan view (see FIG. 2) and a plurality of grooves 20 formed in the upper surface 11 around the central opening 18. There are twenty-four of the grooves 20 spaced uniformly around the central opening 18 and each extending radially of the opening 18 (see FIG. 2). Each groove 20 is narrow so that the spaces between the grooves 20 provide a firm support on which an article of glassware 12 can rest. In a modification of the illustrative dead plate arrangement, the grooves 20 can be replaced by openings through the dead plate 10 the openings having the same cross-section as the grooves 20, but in this case the lower ends of the openings have to be isolated from the chamber 16.

In the operation of the glassware forming machine of which the illustrative dead plate arrangement forms part, a take-out mechanism (not shown) of the machine operates to position an article 12 of glassware on the upper surface 11 so that the central opening 18 is beneath a central region of the bottom 22 of the article 12. The article 12 rests on the spaces between the grooves 20 with each of the grooves 20 extending from beyond the article 12 to beneath the bottom 22 of the article (see FIG. 1).

The illustrative dead plate arrangement also comprises suction means operable to suck air through the central opening 18 in the dead plate 10 so that, when an article 12 is positioned as aforesaid, the suction means is operable to suck air through the grooves 20 into the central opening 18 so that the air flows past the bottom 22 of the article and serves to cool it (the direction of air flow is indicated by arrows in FIG. 1). The suction means comprises a pipe 24 which is connected to an underside of the dead plate 10 in alignment with and sealing engagement to the opening 18. The pipe 24 passes through the chamber 14 and is connected to a fan (not shown) of the suction means which is operable to suck air as aforesaid.

The illustrative dead plate arrangement also comprises blowing means operable, when an article 12 is positioned as aforesaid, to blow air on to sidewalls of the article through a plurality of nozzles 26 which are substantially uniformly spaced around the article 12 so that air is caused to flow past the sidewalls to cool them. There are sixteen nozzles 26 arranged around a circle centred on the central opening 18. Each nozzle 26 comprises a narrow opening 28 directed towards the article 12 and a wide opening 30 which opens into the chamber 16. The shape of the nozzles 26 is arranged to guide an air stream from the opening 30 to the exit 26 thereof so that the air leaves the nozzle 26 at high velocity and does not create excessive noise in doing so. The blowing means comprises a fan (not shown) operable to blow air into the chamber 16 so that the air leaves through the nozzles 26. The nozzles 26 are, thus, formed by openings in the upper surface 11 of the dead plate 10 and communicate with the chamber 16 beneath the dead plate 10.

The illustrative dead plate arrangement also comprises valve means (not shown) operable, in timed relationship to the operation of the machine of which the illustrative dead plate arrangement forms part, to cause the suction means to begin to operate before an article is positioned on the dead plate as aforesaid in the operation of the machine and to continue operating until the article 12 is removed from the dead plate. The valve means operates to open or close the connection between the pipe 24 and the aforementioned fan.

The illustrative arrangement also comprises valve means operable in timed relationship to the operation of the machine, to cause the blowing means to begin to operate when an article is positioned as aforesaid and to continue operating for a predetermined period. This valve means comprises a flap valve (not shown) operable to open or close the connection between the aforementioned fan and the chamber 16.

The illustrative dead plate arrangement is used in the illustrative method of cooling a newly-moulded article 12 of glassware. The illustrative method comprises positioning the article 12 on the upper surface 11 of the dead plate 10 using the take-out mechanism of the glassware forming machine of which the illustrative dead plate arrangement forms part. The article 12 is positioned so that the central opening 18 is beneath a central region of the bottom of the article 22 and each of the grooves 20 extends from beyond the article 12 to beneath the bottom of the article 22. The illustrative method also comprises sucking air through the central opening 18 by operating the suction means of the illustrative dead plate arrangement so that the air is sucked through the grooves 20 into the central opening 18 and the air flows past the bottom 22 of the article. The illustrative method also comprises blowing air on to sidewalls of the article 12 through the nozzles 26 so that the air is caused to flow past the sidewalls.

In the illustrative method, the sucking of air through the central opening 18 is commenced before the article is positioned so that as soon as the article is in position the suction effect begins to maintain the article in position. Blowing air on to the sidewalls is commenced, in the illustrative method, after the article is positioned and is continued for a predetermined time which is determined by a degree of cooling required by the article. The application of the suction and the blowing is controlled by the aforementioned valve means in timed relation to the operation of the machine of which the illustrative dead plate arrangement forms part.

In the illustrative method, even relatively light articles of glassware can be positioned on the surface 11 and are not displaced by the operation of the suction and blowing means. Furthermore, the bottom of the article can be effectively cooled by the air passing through the grooves 20 and the heat in the area of the dead plate arrangement is reduced as some of the heat passes into the opening 18 along with the air and, it is found that, the noise in the area of the dead plate arrangement is less than in conventional arrangements.

I claim:

1. method of cooling a newly-moulded article of glassware, the method comprising positioning the article on a substantially horizontal upper surface of a dead plate, the upper surface having a central opening therein and a plurality of grooves or openings formed in the upper surface around the central opening, the article being positioned so that the central opening is beneath the central region of the bottom of the article and each of the grooves or openings extends from beyond the article to beneath the bottom of the article, the method also comprising sucking air through the central opening so that the air is sucked through the grooves or openings into the central opening and the air flows past the bottom of the article, and blowing air on to sidewalls of the article through a plurality of nozzles which are substantially uniformly spaced around the article so that air is caused to flow past the sidewalls.

2. A method according to claim 1, wherein sucking the air through the central opening is commenced before the article is positioned as aforesaid.

3. A method according to claim 1, wherein blowing air on to the sidewalls is commenced after the article is positioned as aforesaid and is continued for a predetermined time.

4. A dead plate arrangement for a glassware manufacturing machine, the arrangement comprising a dead plate having a substantially horizontal upper surface on which newly-moulded articles of glassware can be positioned for cooling, the upper surface having a central opening therein and a plurality of grooves or openings formed in the upper surface around the central opening, the grooves or openings being so arranged that, when an article of glassware is positioned on the upper surface so that the central opening is beneath the central region of the bottom of the article, each of the grooves or openings extends from beyond the article to beneath the bottom of the article, the arrangement also comprising suction means operable to suck air through the central opening in the dead plate so that, when an article is positioned as aforesaid, the suction means is operable to suck air through the grooves or openings into the central opening so that the air flows past the bottom of the article, and blowing means operable, when an article is positioned as aforesaid, to blow air on to sidewalls of the article through a plurality of nozzles which are substantially uniformly spaced around the article so that air is caused to flow past the sidewalls.

5. A dead plate arrangement according to claim 4, wherein the nozzles are formed by openings in the upper surface of the dead plate.

6. A dead plate arrangement according to claim 5, wherein the nozzles communicate with a chamber beneath the dead plate and the blowing means comprises a fan operable to blow air into said chamber.

7. A dead plate arrangement according to claim 4, wherein the arrangement also comprises valve means operable, in timed relationship to the operation of the machine, to cause the suction means to begin to operate before an article is positioned as aforesaid in the operation of the machine and to continue operating until the article is removed from the dead plate.

8. A dead plate arrangement according to claim 4, wherein the arrangement also comprises valve means operable, in timed relationship to the operation of the machine, to cause the blowing means to begin to operate when an article is positioned as aforesaid and to continue operating for a predetermined period.

* * * * *